July 5, 1966 P. A. CRESCI 3,259,255
TILTING BODY FOR MOTOR VEHICLES
Filed May 8, 1964 3 Sheets-Sheet 2

INVENTOR
PAUL A. CRESCI
BY Whittemore, Hulbert & Belknap
ATTORNEYS

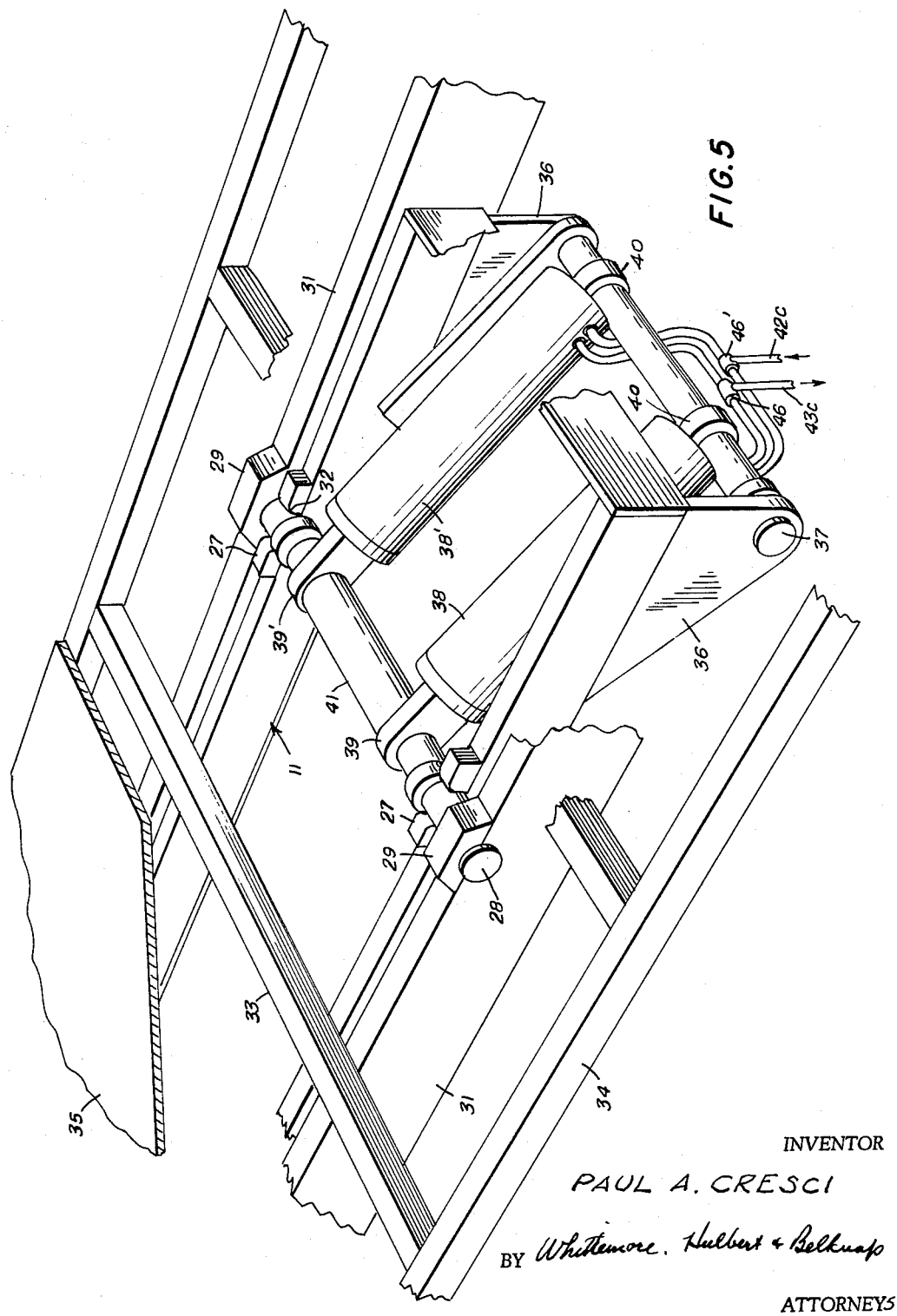

United States Patent Office 3,259,255
Patented July 5, 1966

3,259,255
TILTING BODY FOR MOTOR VEHICLES
Paul A. Cresci, Boulevard and Grape St., Vineland, N.J.
Filed May 8, 1964, Ser. No. 365,933
3 Claims. (Cl. 214—1)

The present invention relates to high-lift load carrying vehicles of the type disclosed in the patent to Cresci 2,706,102 in which pairs of crossed lever arms are pivotally connected and are also pivoted to the elevatable body and the chassis respectively. More particularly the invention pertains to auxiliary lift mechanism for tilting the body either forwardly or rearwardly in any of its elevated positions.

One of the objects of the invention is to provide supplementary hydraulic rams forwardly and rearwardly of the main elevatable body frame designed to elevate one or the other end of a separate deck frame superposed and supported on the main body frame.

Another object of the invention is to provide controls for the main body elevating hydraulic ram and for the supplementary rams with a common source of supply for fluid under pressure and for releasing fluid to a suitable reservoir.

A further object of the invention is so to dispose the auxiliary rams with respect to each other that either may elevate that end of the deck frame adjacent its ram but the rams may not be operated simultaneously.

Other objects of the invention will be apparent from the following description thereof, reference being made to the accompanying drawings in which FIGURE 1 is a side elevation of the principal components of the vehicle, the front thereof being omitted since it forms no part of the invention;

FIG. 5 is a partial perspective of the components shown in FIGS. 2 and 3.

Figure 1:
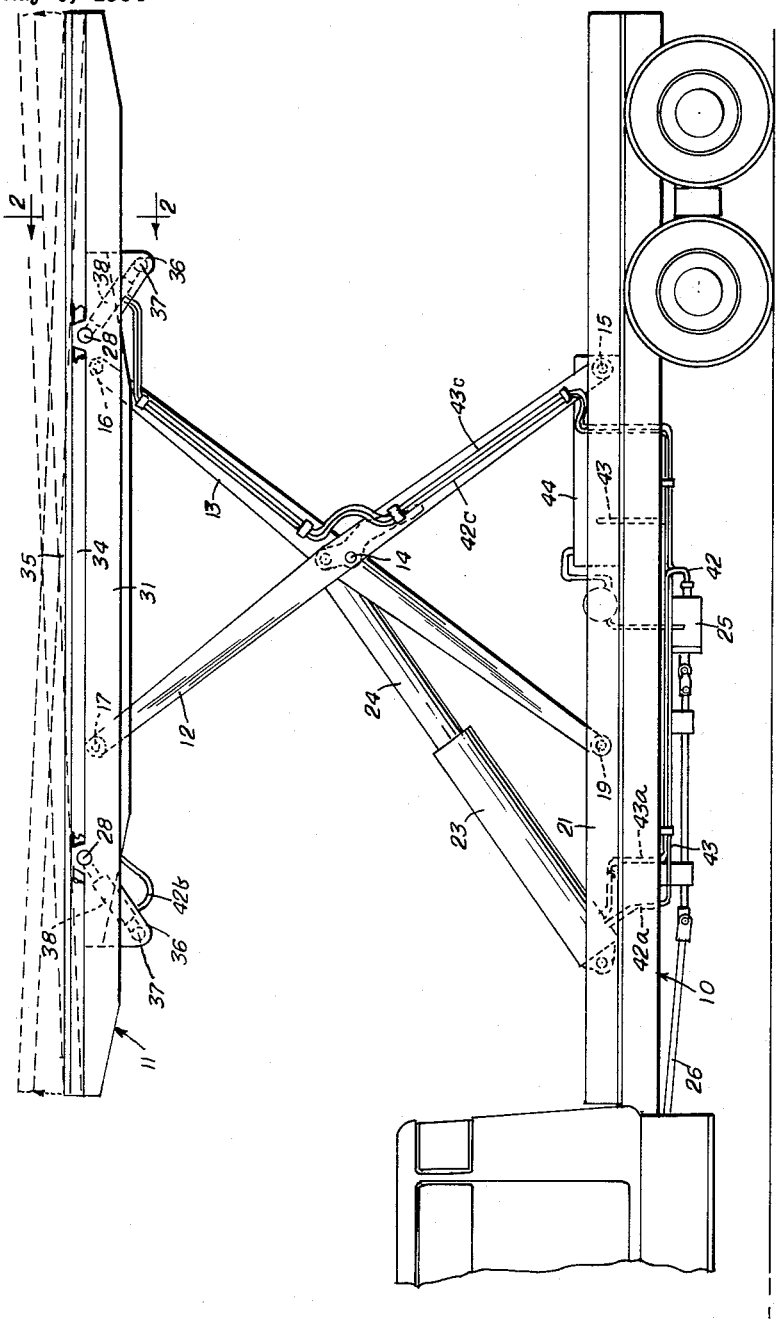
Figure 2:
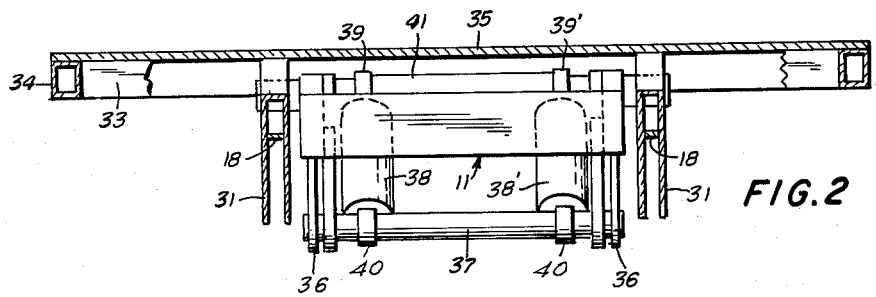
FIG. 2 is a sectional rear view of the main and deck frames taken on line 2—2 of FIG. 1.
Figure 3:
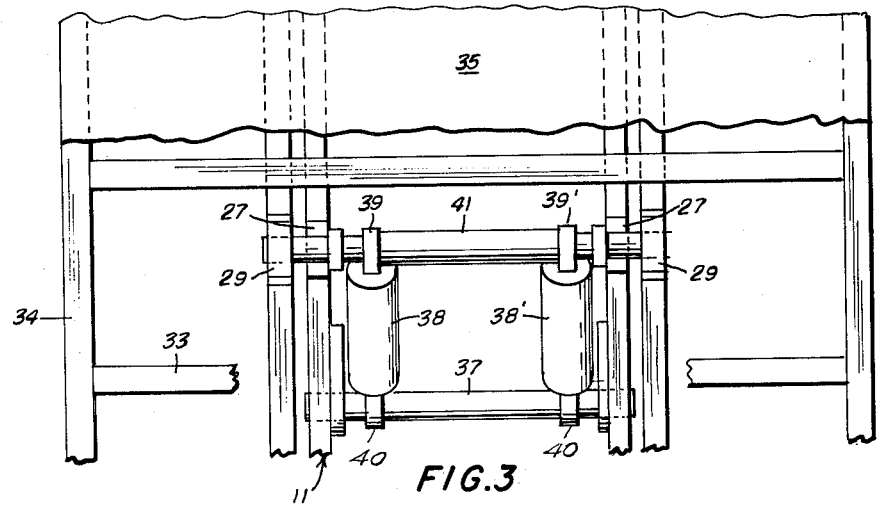
FIG. 3 is a partial top view of the frames showing the arrangement of the auxiliary rams with respect to the frames.

In the drawings the vehicle chassis frame 10 is mounted on conventional wheels, only the rear wheels being shown. The main body frame 11 is connected to the chassis by pairs of levers 12 and 13, these levers being pivotally connected by a cross shaft 14. Levers 12 are pivoted to the chassis at 15, levers 13 being similarly pivoted to the body frame at 16. The upper end of each lever 12 carries a roller 17 constrained to move in straight channel tracks 18 forming part of the main elevatable frame. The lower end of each lever 13 carries a roller 19 constrained to move in channel tracks 21 forming part of the chassis frame.

Pivoted to the chassis frame at 22 is the cylinder 23 of a main hydraulic ram, the piston 24 of which is pivotally connected to cross shaft 14. Pump 25, driven by the vehicle engine through takeoff shaft 26, is adapted to supply fluid under pressure to the main ram.

As will be seen more clearly in FIG. 5, there is provided on the upper face of the body frame at each side and at each end a saddle 27 accommodating cross member 28 journaled at each end in bearings 29 on deck frame 31. The uprights of each saddle are spaced a distance slightly greater than the diameter of cross member 28 and are provided with rounded corners 32 more readily to receive the cross member when entering and leaving the saddle. The deck frame 31 includes superposed cross frame members 33 and side frame members 34 suitably attached to frame 31. An appropriate deck 35 rests on the deck frame.

At each end of the sides of main elevatable frame 11 are spaced depending legs 36 forming bearings for shaft 37. Pivotally connected to each shaft 37 by end bearings 40 are two auxiliary rams 38, 38'. Pistons 39, 39' are pivotally connected to cross shaft 28 and spaced from each other by spacer sleeve 41.

Figure 4:
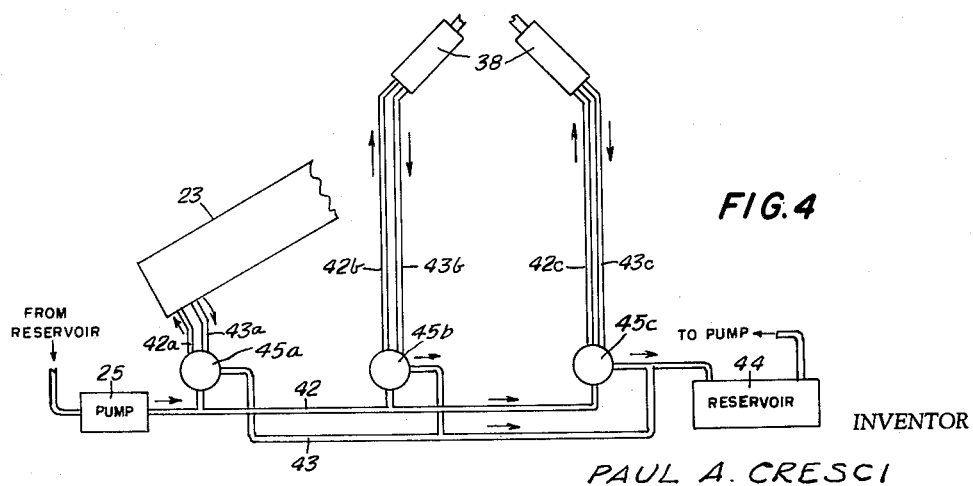
FIG. 4 is a diagram of the conduits and controls for supplying fluid under pressure to the several rams and for releasing such pressure, together with their connections to a pump and reservoir.

Referring now to FIG. 4, it will be seen that fluid, usually oil, under pressure is supplied to main conduit 42 from pump 25. Branch conduits 42a, 42b, and 42c lead to main ram 23, front auxiliary ram 38, and rear auxiliary ram 38, respectively. It will also be seen that return conduits 43a, 43b, and 43c are branches of main return conduit 43 leading to reservoir 44. Appropriate independent valves 45a, 45b, 45c provide control of fluid supply and return in each of the conduit systems. It is to be noted that T-couplings 46, 46' are provided to permit simultaneous supply or return to each of the pairs of auxiliary rams 38, 38'. In FIG. 1 only one set of conduits connecting the auxiliary rams at the rear of the deck frame to the pump and reservoir is shown, but it is to be understood that a similar set of conduits for the front auxiliary rams are disposed on the opposite side of the vehicle.

In FIG. 1 the auxiliary rams are inclined to the deck frame and towards each other, their axes converging. The angle between the horizontal and the axes of the rams when the deck frame is in its lowermost position is less than 45° so that when fluid is admitted to either ram the horizontal component of the force necessary to actuate the ram is greater than the vertical component of this force. Since the distance between the front and rear shafts 28 is fixed and is less than that between the front and rear bearings for shafts 37 simultaneous raising of the front and rear ends of the deck frame is prevented. Obviously the upper ends of the auxiliary ram pistons would be moved toward each other if fluid were supplied simultaneously to the front and rear auxiliary rams, but, since the distance between the front and rear cross shafts 28 is constant, the pistons cannot be moved simultaneously toward each other. On the other hand when either of the auxiliary rams is supplied with fluid, the cross shaft of the other rams remains seated in its saddle acting as a fulcrum. Thus, either forward or rearward tilting of the deck frame about one or the other end of the main body frame is provided for without the addition of locking or holding means for that shaft acting as a fulcrum.

While a preferred embodiment of the invention has been illustrated and described, it is to be understood that it is susceptible of modification within the terms of the appended claims.

I claim:
1. In a vehicle of the class described, an elevatable body frame, a deck frame supported in superposed relation to said body, a cylinder pivotally connected to said body frame at each end thereof, a piston in each of said cylinders, each piston being pivotally connected to said deck frame, the pivotal connections of said pistons with said deck frame being spaced apart a distance less than the distance between the pivotal connections of said cylinders with said body frame, the axes of said cylinders being inclined to the horizontal at an angle less than the angle formed between said axes and the vertical when said deck frame is in its lowermost position, said cylinders converging with respect to each other, and means for supplying fluid under pressure to said cylinders to tilt said deck frame, said angular relation and the spacing of the cylinder pivots permitting relative movement of either piston and cylinder while simultaneously causing the other piston and cylinder to remain stationary.

2. In a vehicle as claimed in claim 1, the pivotal connection of each piston with said deck frame including a cross-shaft secured to said deck frame, said body frame having saddles forming bearings for said cross-shaft, each saddle forming a bearing for one of said cross-shafts, said deck frame being fulcrumed on said one shaft when the other of said cross-shafts is elevated to tilt said deck frame to constrain said one cross-shaft against transverse movement relative to its axis.

3. In a vehicle as claimed in claim 1, a ram comprising a third cylinder and piston for elevating said body frame, said ram being actuatable by said means for supplying fluid, and independent valve means for controlling flow of fluid to and from each of said cylinders.

References Cited by the Examiner

UNITED STATES PATENTS

| 1,909,342 | 5/1933 | Galanot | 298—17.7 |
| 2,706,102 | 4/1955 | Cresci | 254—8 |
| 2,872,052 | 2/1959 | Ferguson | 214—1 |
| 2,931,519 | 4/1960 | Beach | 214—1 |

FOREIGN PATENTS

| 927,554 | 5/1955 | Germany. |

MARVIN A. CHAMPION, *Primary Examiner.*